METHOD FOR PLATING PALLADIUM

Filed Feb. 27, 1961 2 Sheets-Sheet 1

INVENTOR
GEORGE D. FATZER

BY Leo J. Aubel
ATTORNEY

Sept. 22, 1964 G. D. FATZER 3,150,065

METHOD FOR PLATING PALLADIUM

Filed Feb. 27, 1961

2 Sheets-Sheet 2

United States Patent Office 3,150,065
Patented Sept. 22, 1964

3,150,065

METHOD FOR PLATING PALLADIUM

George D. Fatzer, Endwell, N.Y., assignor to International Business Machines Corporation, New York, N.Y., a corporation of New York Filed Feb. 27, 1961, Ser. No. 92,014
4 Claims. (Cl. 204—47)

This invention relates to palladium coated electrical contacts and more particularly to an improved method of coating palladium onto a substrate to provide an improved electrical contact.

Low-energy circuit contacts must be of low and stable contact resistance; this can be assured only if the contact metal is a good conductor and does not tarnish with time. The noble metals, such as gold, and the metals of the platinum family which have very low chemical reactivity and essentially do not oxidize or form sulfides meet the foregoing requirements.

Due to the cost of the noble metals, low-energy circuit contacts are not made entirely of noble metals but, rather, the noble metal is electrodeposited on a base metal substrate. These deposits must be essentially pore-free to prevent foreign matter from entering the pores and spreading onto the contact surface. Porous deposits thus cause films to be formed on the contacts; these films are produced by corrosion products which result either from the tarnishing of the base metal substrate or from direct-couple corrosion between the base and noble metals.

Gold has been widely used for low-energy circuit contacts, since it has excellent resistance to chemical attack and is less expensive than any of the platinum metals with the exception of palladium. However, gold is soft and the common electrodeposited gold alloys suitable for use in low-energy circuit contacts have relatively poor resistance to wear. Palladium, because it is less expensive than gold and is a relatively unreactive member of the platinum family, can effectively replace gold for some contact applications. Also, palladium wears better than gold. Further, the density of palladium is lower than the density of gold; thus, for equal thicknesses, the relative expense of the same thickness of metal contact can be decreased by a factor of two.

Printed circuit cards, that is, cards on which printed circuits are formed, have heretofore used gold in their electrical contacts for connecting to external circuitry. Palladium has previously not been used in electrical contacts for printed circuit cards principally because of electroplating difficulties. According to the prior art, when palladium is plated onto a substrate, stressed electroplates are obtained which tend to crack and hence give porous deposits. As noted above, such porous deposits provide poor electrical contact characteristics.

In prior art printed circuit cards, an intermediate nickel layer is formed between the card substrate and the gold layer; the nickel layer on the card is used to increase the hardness of the metallic contact and to impede or stop solid diffusion of copper into the gold. The nickel intermediate layer may not be needed when a palladium layer is employed; thus, if the nickel is not used, a step in the manufacturing operation of printed circuit cards can be eliminated.

In the prior art, methods for electrodepositing palladium include either a soluble or an insoluble anode process. In the soluble anode process, a palladium anode is used and the pH is maintained between 7 and 9. In the insoluble anode process, two separate and different baths are used and a diaphragm is positioned between the anode electrolyte and a cathode electrolyte to separate the two solutions. The diaphragm is used to maintain the pH of the cathode electrolyte constant; without the diaphragm, the pH of the solution would decrease; rather, ammonium chloride would be formed causing a decrease in pH which ultimately adversely affects the palladium deposition.

The prior techniques, with the exception of the known Atkinson and Raper process, give deposits which are porous and which, because of the porosity, are not suitable for electrical contacts. The Atkinson and Raper process which was first disclosed in about 1933 and described in, for example, the Principles of Electroplating and Electroforming, Blum, Hogaboom; McGraw-Hill, Inc., New York, 1949, does give non-porous deposits. However, the Atkinson and Raper process utilizes a diaphragm and, because diaphragms have the tendency of becoming plugged and stopping the reaction, said process has not been readily adaptable to industrial application.

Accordingly, it is a principal object of the present invention to provide an improved method for depositing palladium on a substrate.

It is another object of this invention to provide an improved process for depositing non-porous layers of palladium.

It is another object of this invention to provide a method for depositing palladium, which deposits are suitable for use as electrical contacts.

It is yet another object of the present invention to provide an improved method for depositing palladium suitable for use as electrical contacts for printed circuit cards.

In one form, the invention provides an improved method of depositing palladium on a substrate by electrolysis which comprises the steps of immersing an anode in a palladosamine solution, immersing the substrate to be coated in said solution in spaced relation to said anode, and applying a potential difference between said anode and said substrate.

The foregoing and other objects, features and advantages of the invention will be apparent from the following more particular description of a preferred embodiment of the invention, as illustrated in the accompanying drawings.

Figure 1:
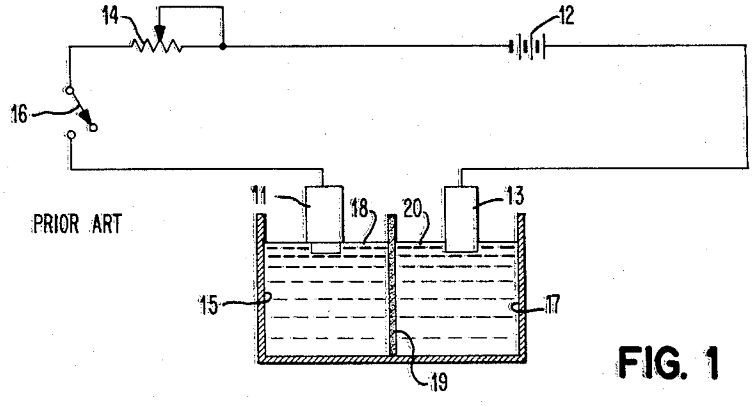
FIG. 1 is a sketch of apparatus for practicing the prior art Atkinson and Raper process.

Referring to FIG. 1, Atkinson and Raper disclosed a process in which a base metal cathode 11 and an insoluble platinum anode 13 are used and the cathode and anode compartments 15 and 17 are separated by a diaphragm 19. An electric circuit including a battery 12, a variable resistor 14, and a switch 16 connects the electrodes 11 and 13. The diaphragm is made of porous clay tiles or porcelain and permits ionic diffusion but inhibits diffusion of the anions to the cathode electrolyte and of the cations to the anode electrolyte. The solution 18 in the cathode compartment 15 contains 40 grams/liter of palladosamine chloride, $Pd(NH_3)_2Cl_2$; 35 milliliters/liter of ammonium hydroxide, $NH_4OH$; and 10 grams/liter of ammonium chloride, $NH_4Cl$. The solution 20 in the anode 17 compartment contains 10 grams/liter of ammonium carbonate, $(NH_4)_2CO_3$; 20 grams/liter of ammonium sulfate, $(NH_4)_2SO_4$; and 50 milliliters/liter of ammonium hydroxide. As the palladium is plated out, the chloride concentration builds up; however, the chloride is an anion so it migrates towards the anode, diffuses through the diaphragm to the compartment containing the anode electrolyte and thus does not influence the pH of the cathode electrolyte. In the Atkinson and Raper process, apparently, if the diaphragm is removed, the pH of the solution will decrease; that is, the ammonium chloride formed will cause a decrease in pH which adversely affects the plating operation.

Figure 2:
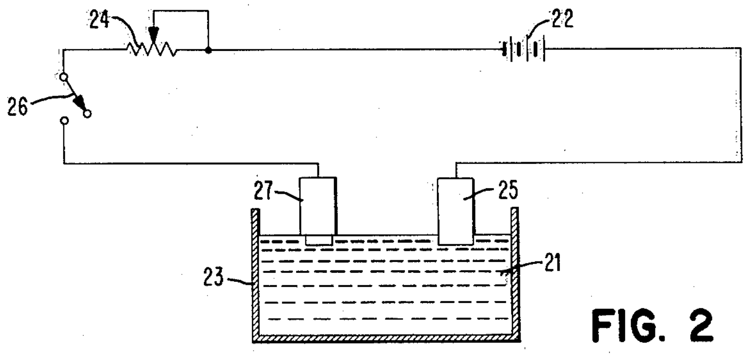
FIG. 2 is a sketch showing apparatus utilized in practicing the method of forming a palladium deposit in accordance with the invention.

In contrast to the foregoing, an apparatus for practicing the method according to the invention is shown in FIG. 2. In FIG. 2, a palladosamine bath or solution 21 is placed in a container 23. An anode 25 of a noble metal such as platinum is mounted on one end of the container and the substrate 27 to be coated is mounted in a jig, not shown, in spaced relation to the anode. Note that the diaphragm of the prior art has been eliminated. An electrical circuit including a battery 22, a variable resistor 24, and a switch 26 is provided to connect anode 25 and substrate 27. As is known, the electrolysis phenomenon will cause the substrate 27 to be coated with palladium.

The bath or solution 21 comprises palladosamine chloride, $Pd(NH_3)_2Cl_2$, in an electrolyte comprising 10 grams/liter of ammonium chloride, $NH_4Cl$; 50 milliliters/liter of ammonium hydroxide, $NH_4OH$; and 25 grams/liter of ammonium sulfate, $(NH_4)_2SO_4$. The best palladium electrodeposits are obtained by using a 60 gram/liter solution of palladosamine chloride, using a current density of 2.4 amps/dm.$^2$, maintaining the solution 21 at ambient temperature, and providing no agitation thereto. Electroplate porosities are at a minimum with this solution, and relatively pore-free deposits are obtained with thicknesses of as low as 1.25 microns of palladium. The electrodeposits obtained on the substrate 27 are highly adherent and can withstand a double bend test (tension and compression). Phenolic and epoxy laminates having a layer of electrolytic copper bonded thereto, as well as solid copper boards, can be electroplated. With a well-polished substrate surface, the palladium electrodeposit has a fine quality or bright finish. Brightness and lack of porosity should not be related too closely; however, in this case the two appear to coincide.

Figure 3:
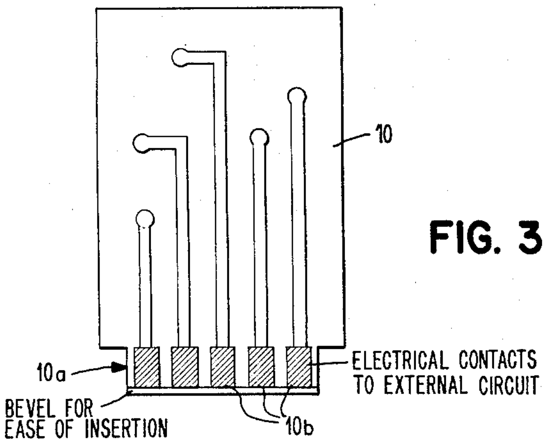
FIG. 3 is a sketch of a printed circuit card showing the palladium deposit.

A printed circuit card 10 of, say, a phenolic or epoxy material which may be plated by the method in accordance with the invention is shown in FIG. 3. The portion of the board which has the palladium deposited thereon for providing the electrical contacts to external circuits is designated as **10*a* and the actual palladium layer strips 10*b* are indicated by the metallic cross-hatching. To form the strips 10*b*, masking means of any suitable type are applied on portion 10*a*. As is known, the card 10 is mounted and electrically connected to external circuitry by inserting portion 10*a*, and thus conducting strips 10*b***, into a suitable female receptacle.

In contrast to the teaching of the prior art, it has been found that better, or less porous, electroplates are obtained in the absence of agitation. Generally, lack of agitation encourages concentration polarization which is normally detrimental to electroplate quality; however, not so in this case. Secondly, it has been observed that, for equivalent agitation conditions, an increase in current density causes a decrease in porosity; minimum porosities are obtained with a current density at 2.4 amps/dm.$^2$. Further increases in current densities introduce increases in porosity.

Palladium is less noble than gold; thus, it reacts more readily with nitrogen oxides and sulfur dioxide. Therefore, in certain applications, it may be desirable to flash the palladium deposit with a gold coating to thus protect the palladium against any possible corrosion. The palladium is flashed by any suitable known method with approximately 0.2 to 0.6 microns of gold, that is, just sufficient gold to cover the surface of the palladium to prevent the corrosive agents from reacting with the palladium. By this method, approximately 7/8 of the gold used in prior art cards is eliminated and, consequently, the cost of the cards can be decreased.

Figure 4:
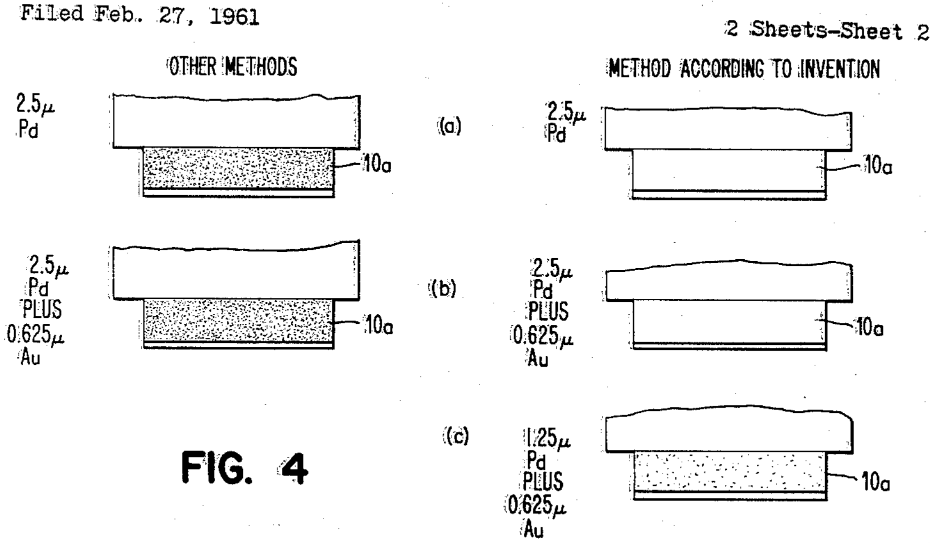
FIG. 4 shows samples of palladium deposited according to the method of the invention in contrast to palladium deposited in accordance with the methods of the prior art.

Printed circuit cards plated in accordance with the invention were compared with cards obtained from commercial sources. In particular, the porosities of the electrodeposits were compared since, as noted hereinabove, this is a major criteria as to the electrical characteristics of the deposit. FIG. 4 shows sketches of some of the representative results of the foregoing tests made; in FIG. 4, the cards obtained from commercial sources are indicated as other methods. For purposes of comparison, the portions **10*a* of the cards shown in FIG. 4 were plated with solid layers of palladium and of gold, as indicated. For actual application or use in circuits, the portion 10*a* would have plated strips 10*b***, as shown in FIG. 3.

The porosity of the deposits was determined by electrographic tests, which tests rely on the property that the least noble metal of an electrode will dissolve first when an alloy is used as an anode for electrolysis. To determine the porosity of an electrodeposit, the sample was connected as an anode; filter paper soaked with an electrolyte ($NaCl$, $KNO_3$, $Na_2CO_3$, etc.) was placed between the anode and the cathode; and current was applied to the system. As a result of the galvanic couple and the electrical field applied, the base metal at the bottom of the pores dissolved and the metallic ions produced migrated up through the pores to the filter paper, where they become embedded. An appropriate chemical gave a color reaction with the ion under investigation, thus indicating porosity distribution. As can be seen from the sketches (*a*), FIG. 4, a layer of palladium which is 2.5 microns ($\mu$) or 100 microinches thick and is deposited according to the invention has no porosity. In contrast, a 2.5 micron thick layer of palladium deposited by other methods has considerable porosity. Likewise, a layer of palladium of 2.5 microns thickness deposited in accordance with the invention and including a layer (flashing) of 0.625 microns of gold superposed thereon has little or no porosity, see sketches (*b*). In comparison, a similar composite layer deposited by other methods is very porous. In fact, as shown in sketches (*c*), a layer of 1.25 microns of palladium including a flashing of 0.625 microns of gold deposited in accordance with the invention has less porosity than either the layer of 2.5 microns of palladium or the layer of 2.5 microns of palladium plus the layer of 0.625 microns of gold deposited by other methods.

Palladium was also deposited using other concentrations of solution. Solutions of 20, 40 and 80 grams/liter of palladosamine chloride were dissolved in the electrolyte which, as noted above, comprises 10 grams/liter $NH_4Cl$, 50 milliliters/liter $NH_4OH$ and 25 grams/liter $(NH_4)_2SO_4$. For the 80 grams/liter solution, it was necessary to add an additional 10 milliliters of ammonium hydroxide, $NH_4OH$, to dissolve the palladosamine chloride.

It has been found that the 20 grams/liter solution can be used over a wide spectrum of conditions, such as low current densities (0.56 amp/dm.$^2$) and no agitation, or at medium current densities (1.1 amps/dm.$^2$) with agitation. Palladium electroplate porosities are at a minimum for low current densities. The bath plating efficiency is good at 25° C., and quite poor at 50° C.

The optimum plating conditions for the 40 grams/liter solution are obtained at ambient temperature using little, if any, agitation and providing a current density of 1.1 amps/dm.$^2$.

The optimum plating conditions for the 80 grams/liter solution are obtained at ambient temperature using current densities in the range of 1.6 to 2.4 amps/dm.$^2$. With this solution the minimum thickness necessary to obtain relatively pore-free deposits is 2.5 microns in contrast to 1.25 microns for the 60 grams/liter solution.

Figure 5:
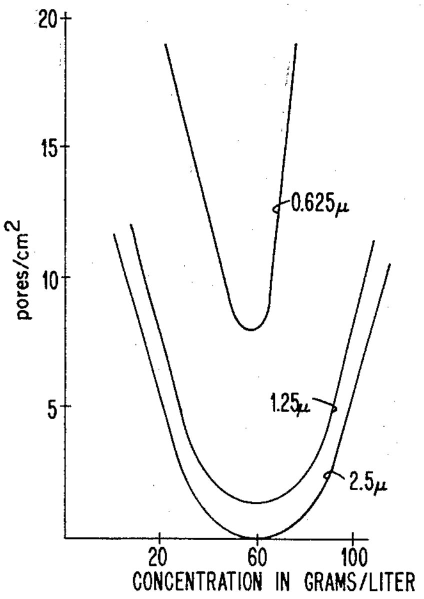
FIGS. 5 and 6 are graphs useful in explaining the method of palladium deposition in accordance with the invention.

Referring to FIG. 5, it is seen that porosity is a parabolic function of palladosamine concentration; as concentration increases, porosity decreases down to a minimum at about 60 grams/liter solution; then, as the concentration is further increased, the porosity again increases. Three curves for palladium layer thickness of 0.625 micron, 1.25 microns and 2.5 microns are shown.

Hardness of electroplated palladium on bulk copper was measured and found to be greater than that of electroplated gold. Further, additions of saccharin to the plating solution result in a lower electrodeposit hardness. It was also found that additives, such as saccharin and sodium lauryl sulfate, have a detrimental effect on porosity; i.e., considerably thicker layers of palladium have to be deposited in order to obtain pore-free deposits.

Figure 6:
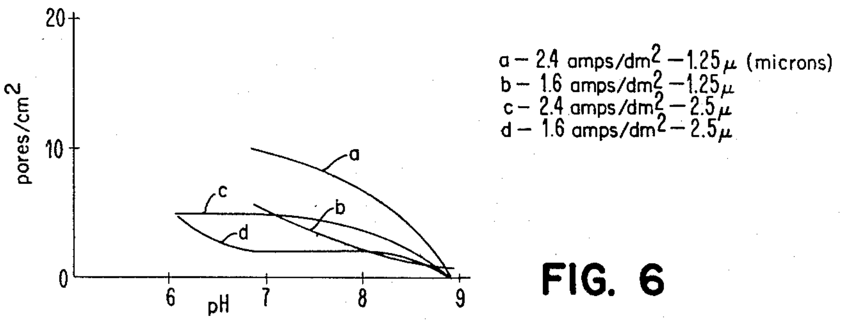

The influence of pH on electrodeposit porosity is seen from FIG. 6. FIG. 6 shows that porosity is low or nonexistent, depending on thickness and plating conditions, for a pH of 9. As the pH is decreased, porosity increases until the precipitation pH of 6 is reached. For low pH values, porosity increases with increasing current densities. The pH working range of the palladosamine chloride solution should be in the range of 8.5 to 9. In FIG. 6, curve *a* was obtained using a current density of 2.4 amps/dm.$^2$ and with a plating or layer thickness of 1.25 microns. The other curves were obtained using the current densities and layer thickness indicated in the legend included in FIG. 6.

Palladium deposited in accordance with the method of the invention provided a better wearing surface than gold. It has been found that, if the deposited surfaces making physical contact with the external circuit are lubricated by any suitable lubricant and if the surface is of palladium, little of the metal is worn off the deposited layers. Also, for unlubricated surfaces, palladium wears considerably better than gold. Further, the wear on a gold surface also decreases to a point which is not objectionable.

While the invention has been particularly shown and described with reference to a preferred embodiment thereof, it will be understood by those skilled in the art that various changes in form and details may be made therein without departing from the spirit and scope of the invention.

What is claimed is:

1. A method for depositing palladium on a substrate by electrolysis comprising the steps of immersing an anode in a diaphragmless bath solution consisting of 60 grams per liter of palladosamine chloride, 10 grams per liter of ammonium chloride, 50 milliliters per liter of ammonium hydroxide, and 25 grams per liter of ammonium sulfate; immersing the substrate to be coated in said solution and in spaced relation to said anode; applying a potential difference between said anode and said substrate to obtain a current density of 1.1 to 2.4 amperes per decimeter$^2$; maintaining said solution at ambient temperature; providing no agitation thereto.

2. A method for depositing palladium on a substrate by electrolysis comprising the steps of immersing an anode in a diaphragmless bath solution consisting of 20 to 60 grams per liter of $Pd(NH_3)_2Cl_2$, 10 grams per liter of $NH_4Cl$, 50 milliliters per liter $NH_4OH$, and 25 grams per liter $(NH_4)_2SO_4$; immersing the substrate to be coated in said solution and in spaced relation to said anode; applying a potential difference between said anode and said substrate to obtain a current density of from 0.56 to 2.4 amperes per decimeter$^2$; maintaining said solution at ambient temperature.

3. A method for depositing palladium on a substrate by electrolysis comprising the steps of immersing an anode in a diaphragmless bath solution consisting of 80 grams per liter of $Pd(NH_3)_2Cl_2$, 10 grams per liter of $NH_4Cl$, 60 milliliters per liter $NH_4OH$, and 25 grams per liter $(NH_4)_2SO_4$; immersing the substrate to be coated in said solution and in spaced relation to said anode; applying a potential difference between said anode and said substrate to obtain a current density of from 1.6 to 2.4 ampers per decimeter$^2$; and maintaining said solution at ambient temperature.

4. A method for depositing palladium on a substrate by electrolysis comprising the steps of immersing an anode in a diaphragmless bath solution consisting of 60 grams per liter of palladosamine chloride, 10 grams per liter of ammonium chloride, 50 milliliters per liter of ammonium hydroxide, and 25 grams per liter of ammonium sulfate, immersing the substrate to be coated in said solution and in spaced relation to said anode, applying a potential difference between said anode and said substrate to obtain a current density of 1.1 to 2.4 amperes per decimeter$^2$; maintaining said solution at ambient temperature; providing no agitation to said solution; permitting a layer of 2.5 microns of palladium to be deposited on said substrate whereby pore-free deposits are obtained.

References Cited in the file of this patent

UNITED STATES PATENTS

| | | |
|---|---|---|
| 1,779,436 | Keitel | Oct. 28, 1930 |
| 1,921,941 | Powell et al. | Aug. 8, 1933 |
| 1,981,715 | Atkinson | Nov. 20, 1934 |
| 1,991,995 | Wise | Feb. 19, 1935 |
| 2,452,308 | Lambros | Oct. 26, 1948 |

FOREIGN PATENTS

| | | |
|---|---|---|
| 380 of 1878 | Great Britain | Jan. 29, 1878 |
| 367,587 | Great Britain | Feb. 25, 1932 |
| 844,358 | Great Britain | Aug. 10, 1960 |